United States Patent
Seok

(10) Patent No.: US 9,516,674 B2
(45) Date of Patent: Dec. 6, 2016

(54) METHOD AND APPARATUS FOR BACKOFF FOR SLOTTED CHANNEL ACCESS IN WIRELESS LAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 14/100,911

(22) Filed: Dec. 9, 2013

(65) Prior Publication Data

US 2014/0169290 A1 Jun. 19, 2014

Related U.S. Application Data

(60) Provisional application No. 61/739,658, filed on Dec. 19, 2012, provisional application No. 61/740,424,
(Continued)

(51) Int. Cl.
*H04L 5/04* (2006.01)
*H04W 74/00* (2009.01)
(Continued)

(52) U.S. Cl.
CPC .......... *H04W 74/006* (2013.01); *H04W 4/005* (2013.01); *H04W 74/0808* (2013.01); *H04W 84/12* (2013.01)

(58) Field of Classification Search
CPC .......................... H04W 4/005; H04W 74/0808
(Continued)

(56) References Cited

U.S. PATENT DOCUMENTS 8,259,655 B2    9/2012   Choe et al.
8,913,560 B2 * 12/2014   Fischer ............. H04W 52/0229
                                                                370/328
(Continued)

FOREIGN PATENT DOCUMENTS

JP      2006526308 A    11/2006
JP      2015502111 A     1/2015
(Continued)

OTHER PUBLICATIONS

M. Park, "Proposed Specification Framework for TGah", IEEE P802.11 Wireless LANs, IEEE 802.11-12/1406r0, Nov. 15, 2012, XP068040314.
(Continued)

*Primary Examiner* — Mark Rinehart
*Assistant Examiner* — Matthew Hopkins
(74) *Attorney, Agent, or Firm* — Dentons US LLP

(57) ABSTRACT

The present invention relates to a wireless communication system, and more specifically, to a backoff method and apparatus in slotted channel access in a Wireless Local Area Network (WLAN) system are disclosed. A method for performing channel access by a station (STA) in a WLAN system includes: receiving restricted access window (RAW) configuration information for the STA from an access point (AP); performing a backoff procedure using a second backoff function state for channel access within the RAW; and performing a backoff procedure using a first backoff function state at an end of the RAW. The STA maintains a plurality of backoff function states including the first backoff function state used outside the RAW and the second backoff function state used within the RAW.

7 Claims, 19 Drawing Sheets

1st backoff function state

2nd backoff function state

Related U.S. Application Data filed on Dec. 20, 2012, provisional application No. 61/750,299, filed on Jan. 8, 2013.

(51) Int. Cl.
*H04W 4/00* (2009.01)
*H04W 74/08* (2009.01)
*H04W 84/12* (2009.01)

(58) Field of Classification Search
USPC .......................................................... 370/329
See application file for complete search history.

(56) References Cited

U.S. PATENT DOCUMENTS

| | | | |
|---|---|---|---|
| 9,148,873 B1* | 9/2015 | Liu | ........................ H04W 72/04 |
| 2005/0025176 A1 | 2/2005 | Ko et al. | |
| 2005/0111419 A1 | 5/2005 | Kwon et al. | |
| 2007/0032255 A1 | 2/2007 | Koo et al. | |
| 2011/0199905 A1 | 8/2011 | Pinheiro et al. | |
| 2012/0008490 A1 | 1/2012 | Zhu | |
| 2012/0069832 A1 | 3/2012 | Benveniste | |
| 2012/0213166 A1 | 8/2012 | Benveniste | |
| 2013/0128798 A1* | 5/2013 | Liu | ........................ H04W 48/12 |
| | | | 370/312 |

FOREIGN PATENT DOCUMENTS

| | | |
|---|---|---|
| KR | 20050013871 A | 2/2005 |
| KR | 20050049292 A | 5/2005 |
| KR | 20050100951 A | 10/2005 |
| KR | 20060059072 A | 6/2006 |

OTHER PUBLICATIONS

Y. Seok, et al., "Uplink Channel Access General Procedure", IEEE 802.11-12/0831r0, Jul. 12, 2012, XP068039355.

Y. Seok et al., "Backoff Procedure in RAW", IEEE 802.11-13/0080r0, Jan. 13, 2013.

\* cited by examiner

METHOD AND APPARATUS FOR BACKOFF FOR SLOTTED CHANNEL ACCESS IN WIRELESS LAN SYSTEM Pursuant to 35 U.S.C. §119(e), this application claims the benefit of U.S. Provisional Application No. 61/739,658, filed on Dec. 19, 2012, U.S. Provisional Application No. 61/740,424, filed on Dec. 20, 2012, and U.S. Provisional Application No. 61/750,299, filed on Jan. 8, 2013, which are hereby incorporated by reference as if fully set forth herein.

BACKGROUND OF THE INVENTION

Field of the Invention

The present invention relates to a wireless communication system, and more specifically, to a method and apparatus for transmitting or receiving a reference signal.

Discussion of the Related Art

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

SUMMARY OF THE INVENTION

Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

In a wireless LAN system, devices can perform contention based access to a channel (or medium).

Accordingly, the present invention is directed to a new contention based channel access scheme for improving network resource utilization efficiency and fairness when an interval (e.g. RAW (restricted access window)) in which only specific devices are permitted to access channels is set in a wireless LAN system that substantially obviates one or more problems due to limitations and disadvantages of the related art.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

To achieve the object and other advantages and in accordance with the purpose of the invention, as embodied and broadly described herein, a method for performing channel access by a station (STA) in a Wireless Local Area Network (WLAN) system includes: receiving restricted access window (RAW) configuration information for the STA from an access point (AP); performing a backoff procedure using a second backoff function state for channel access within the RAW; and performing a backoff procedure using a first backoff function state at an end of the RAW. The STA may maintain a plurality of backoff function states including the first backoff function state used outside the RAW and the second backoff function state used within the RAW.

In another aspect of the present invention, provided herein is a station (STA) performing channel access in a Wireless Local Area Network (WLAN) system including a transceiver, a processor and a memory. The processor may be configured to receive RAW configuration information for the STA from an AP using the transceiver, to perform a backoff procedure using a second backoff function state for channel access within the RAW and to perform a backoff procedure using a first backoff function state at an end of the RAW. The memory may store a plurality of backoff function states including the first backoff function state used outside the RAW and the second backoff function state used within the RAW.

In the above-described aspects according to the present invention, the following is commonly applicable.

When a backoff procedure is performed before the RAW, the backoff procedure before the RAW may be suspended at a start of the RAW.

A backoff function state for the backoff procedure performed before the RAW may be stored as the first backoff function state at the start of the RAW.

At the end of the RAW, the stored first backoff function state may be restored and the backoff procedure performed before the RAW may be resumed.

When the first backoff function state is not stored, the backoff procedure performed at the end of the RAW may be invoked as a new backoff procedure.

When the RAW configuration information does not allow a cross-slot boundary, backoff countdown may be performed only in one or more slots allocated to the STA within the RAW.

The RAW configuration information allows the cross-slot boundary, backoff countdown may be performed after a slot allocated to the STA within the RAW.

The backoff procedure may be performed based on enhanced distributed channel access (EDCA).

It is to be understood that t is to be understood that both the foregoing general description and the following detailed description of the present invention are exemplary and explanatory and are intended to provide further explanation of the invention as claimed.

Advantageous Effects

According to the present invention, it is possible to provide a new contention based channel access scheme for improving network resource utilization efficiency and fairness when an interval (e.g. RAW (restricted access window)) in which only specific devices are permitted to access channels is set in a wireless LAN system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE INVENTION

Figure 1:
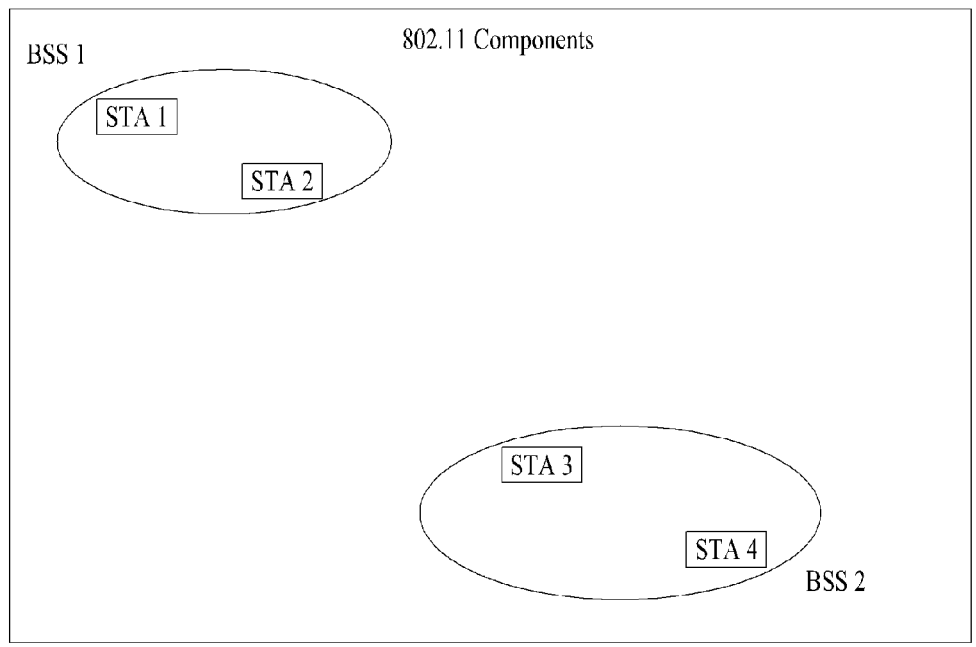
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
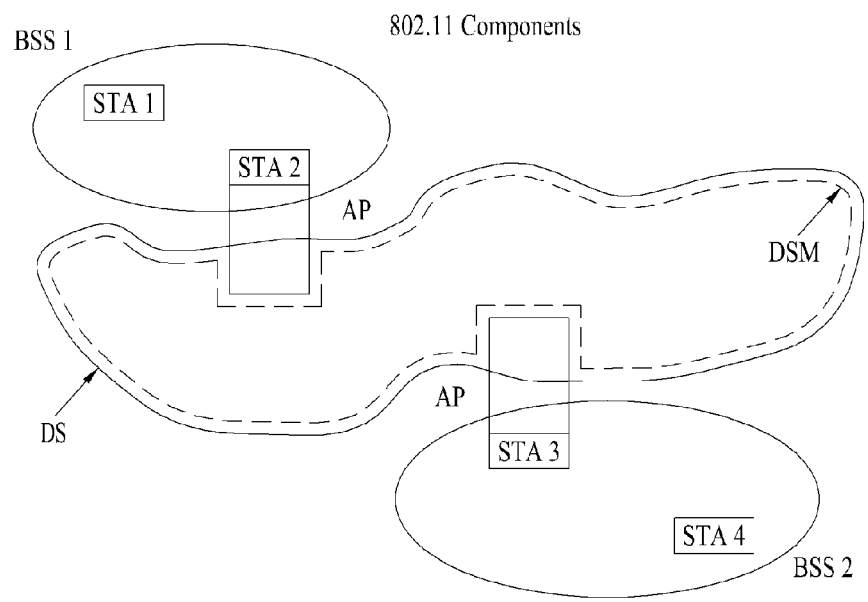
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
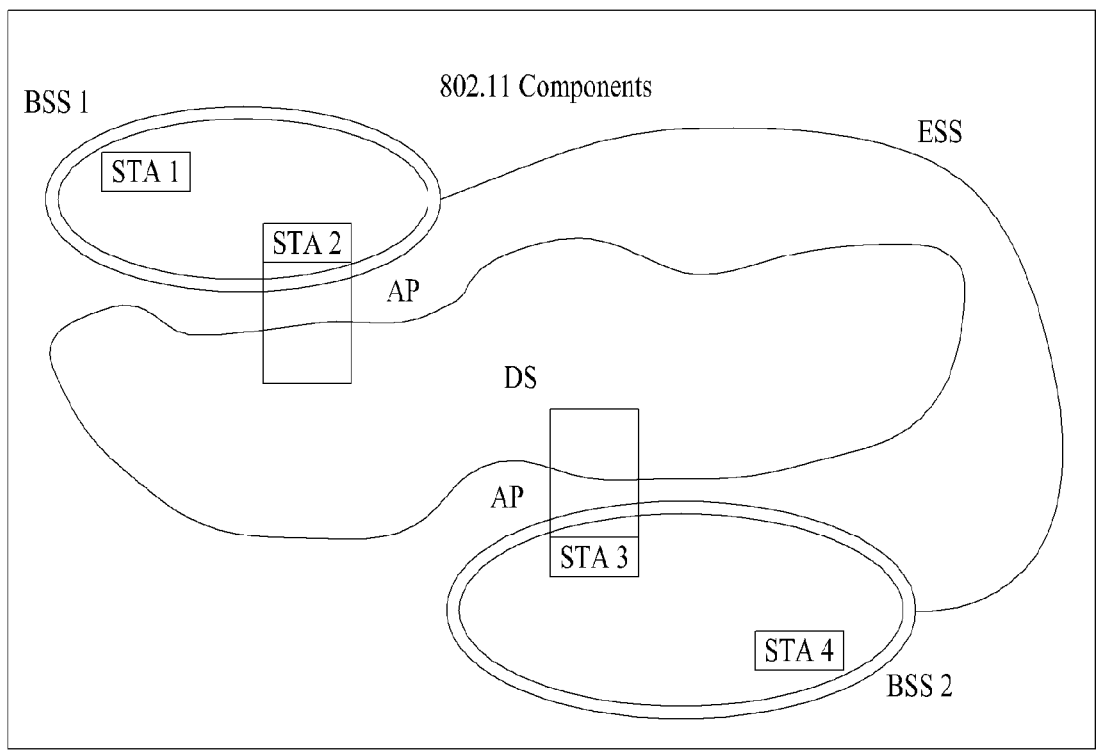
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
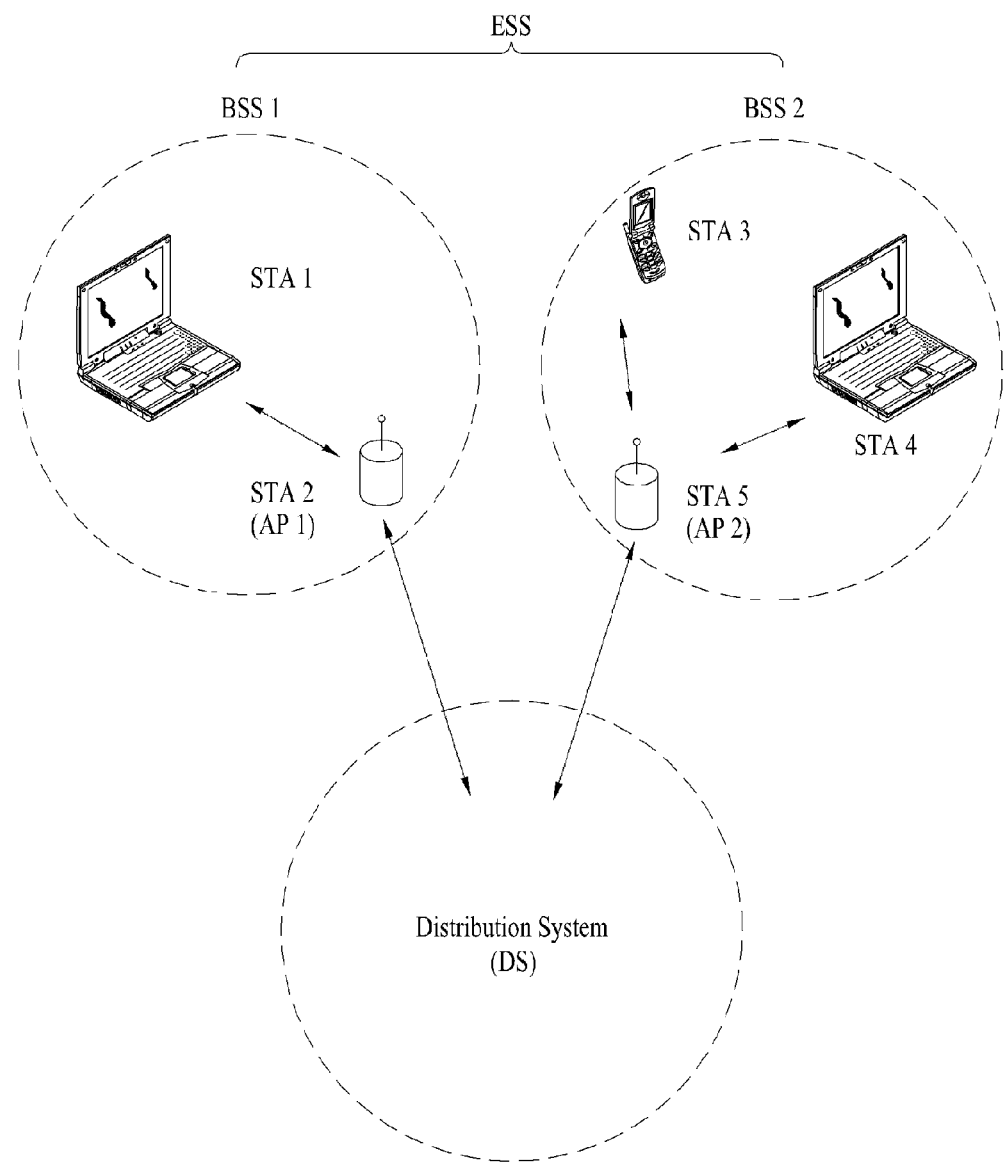
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
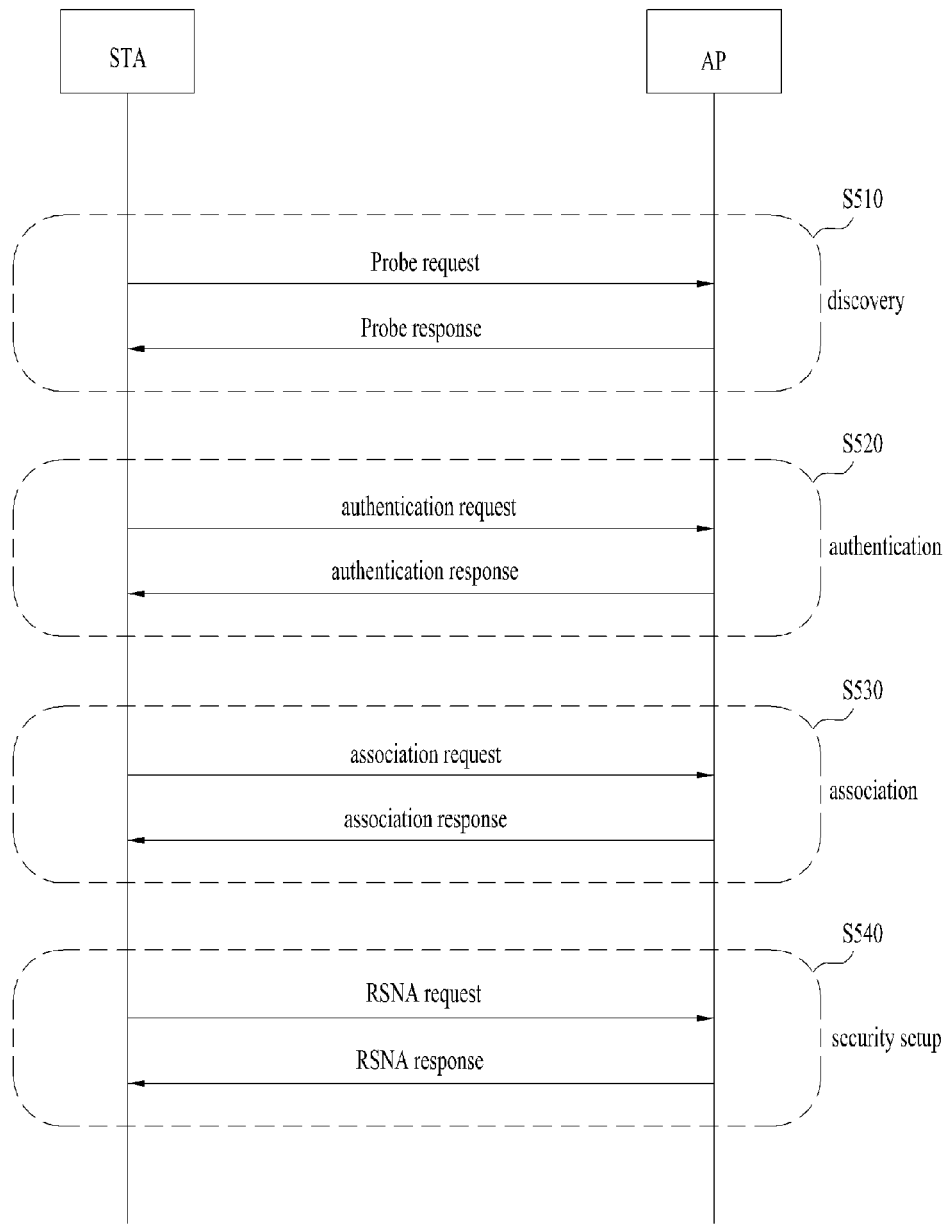
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
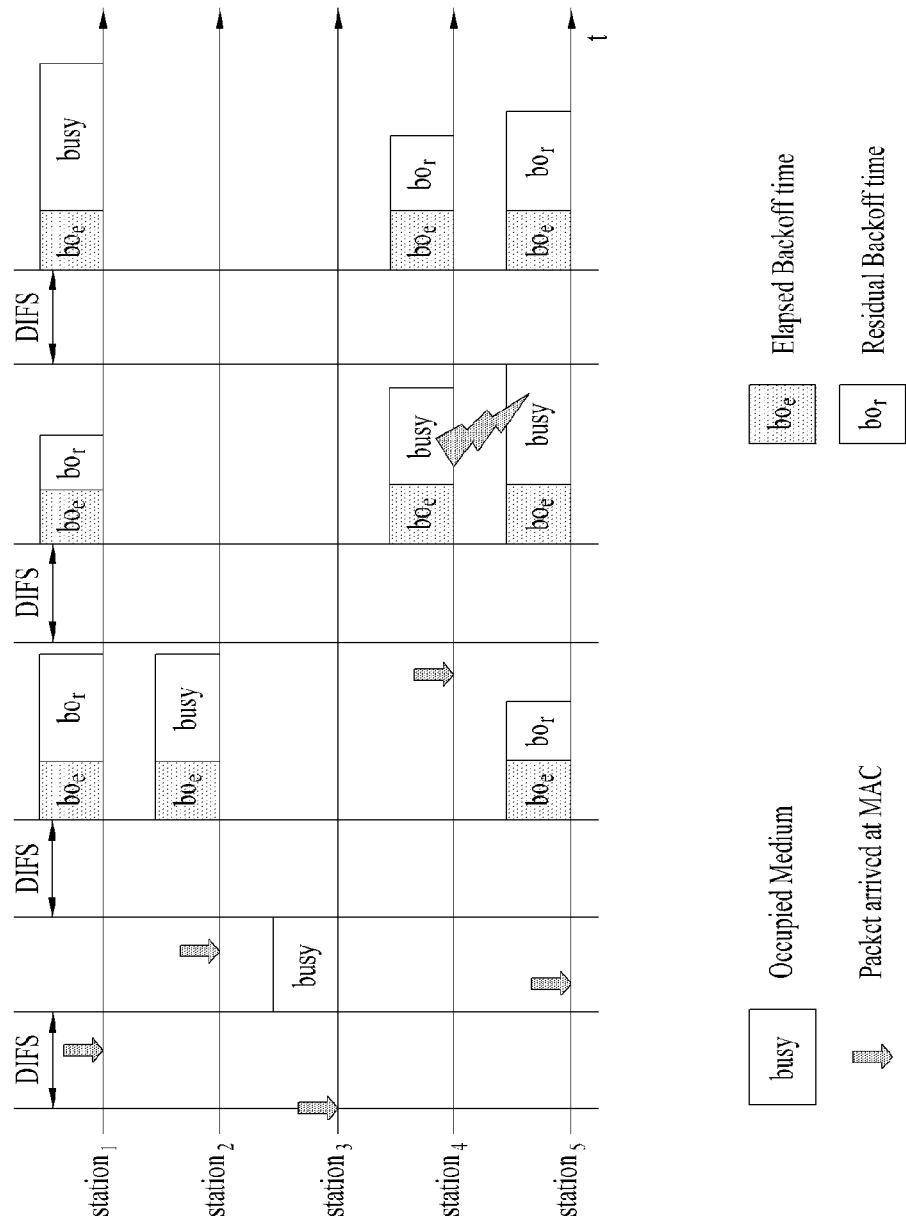
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, ...).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time.

For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
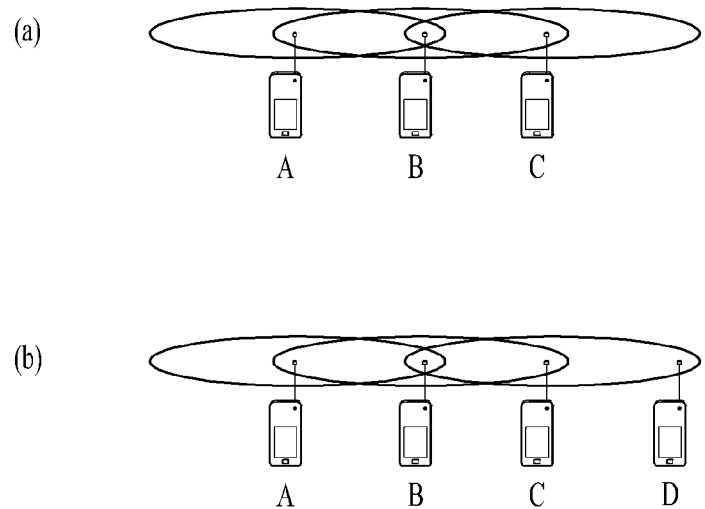
FIG. 7 is a conceptual diagram illustrating a hidden node and an exposed node.

FIG. 7 is a conceptual diagram illustrating a hidden node and an exposed node.

FIG. 7(*a*) exemplarily shows the hidden node. In FIG. 7(*a*), STA A communicates with STA B, and STA C has information to be transmitted. In FIG. 7(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(*b*) exemplarily shows an exposed node. In FIG. 7(*b*), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
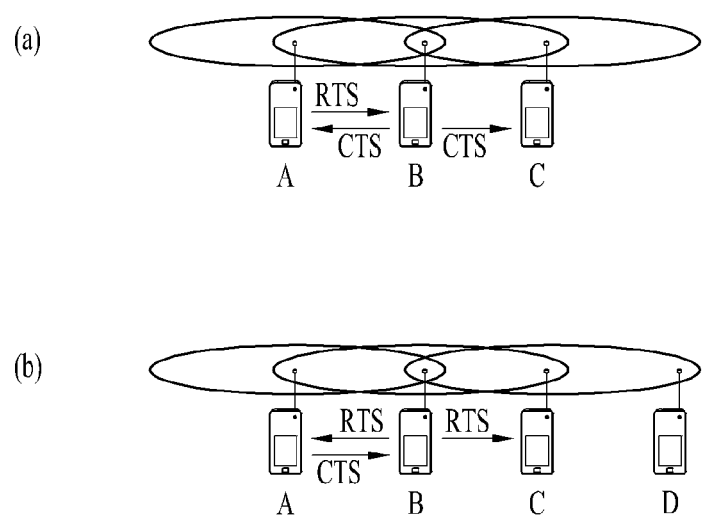
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(*a*) exemplarily shows the method for solving problems of the hidden node. In FIG. 8(*a*), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(*b*) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
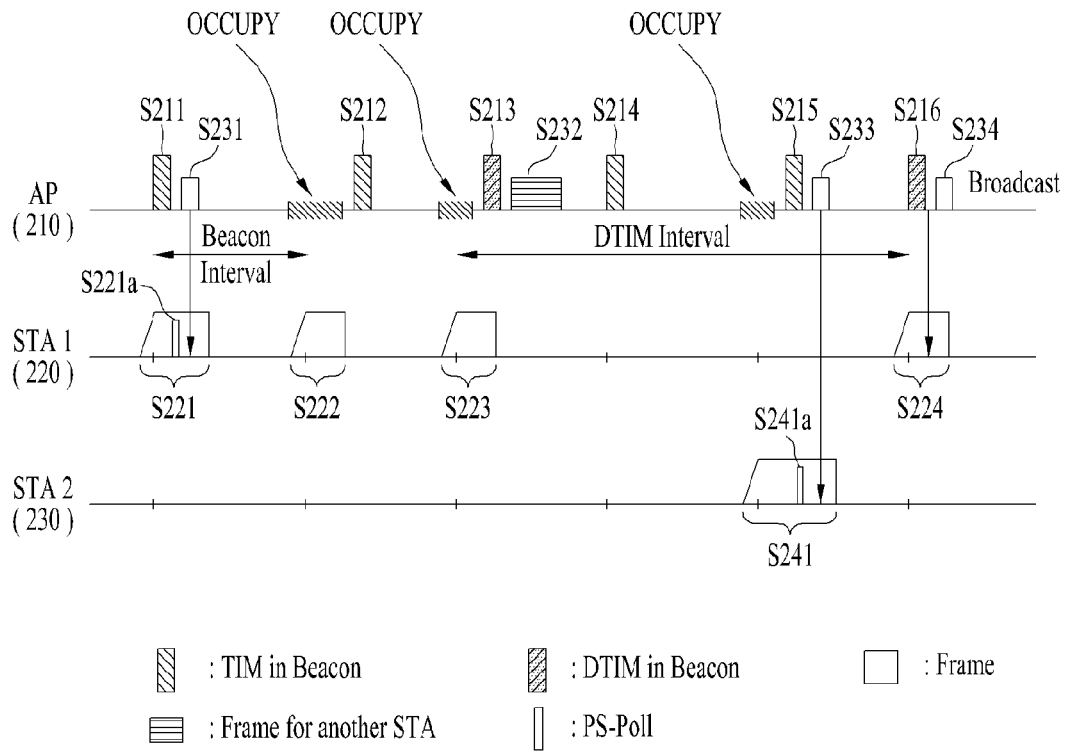
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221*a*. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241*a*. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
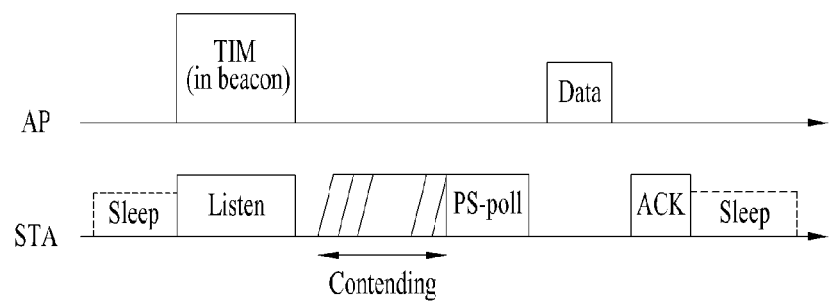
FIGS. 10 to 12 are conceptual diagrams illustrating detailed operations of a station (STA) having received a Traffic Indication Map (TIM).
Figure 11:
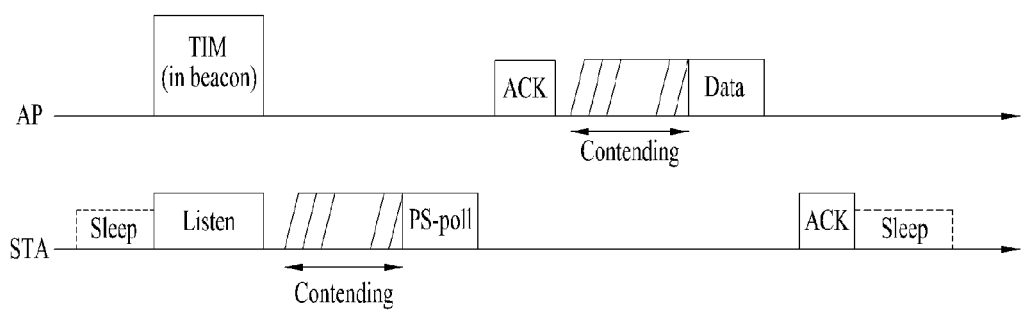
Figure 12:
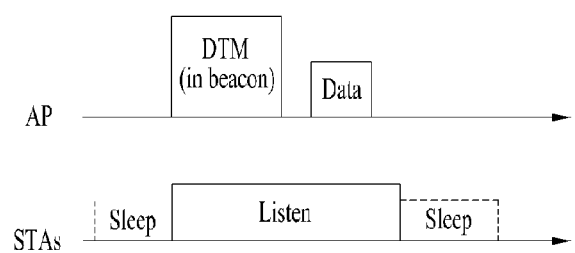

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
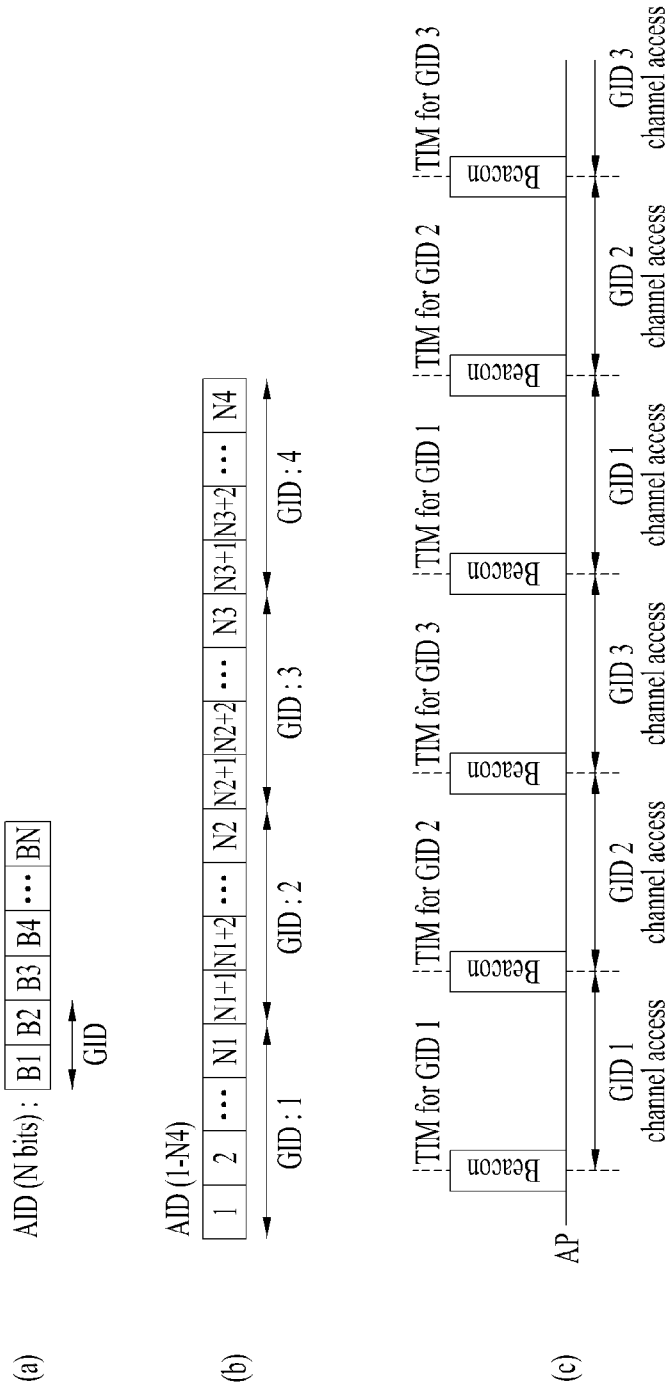
FIG. 13 is a conceptual diagram illustrating a group-based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B-1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2-N1+1), AIDs contained in GID 3 may be represented by Offset (N2+1) and Length (N3-N2+1), and AIDs contained in GID 4 may be represented by Offset (N3+1) and Length (N4-N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed.

Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Frame Format

Figure 14:
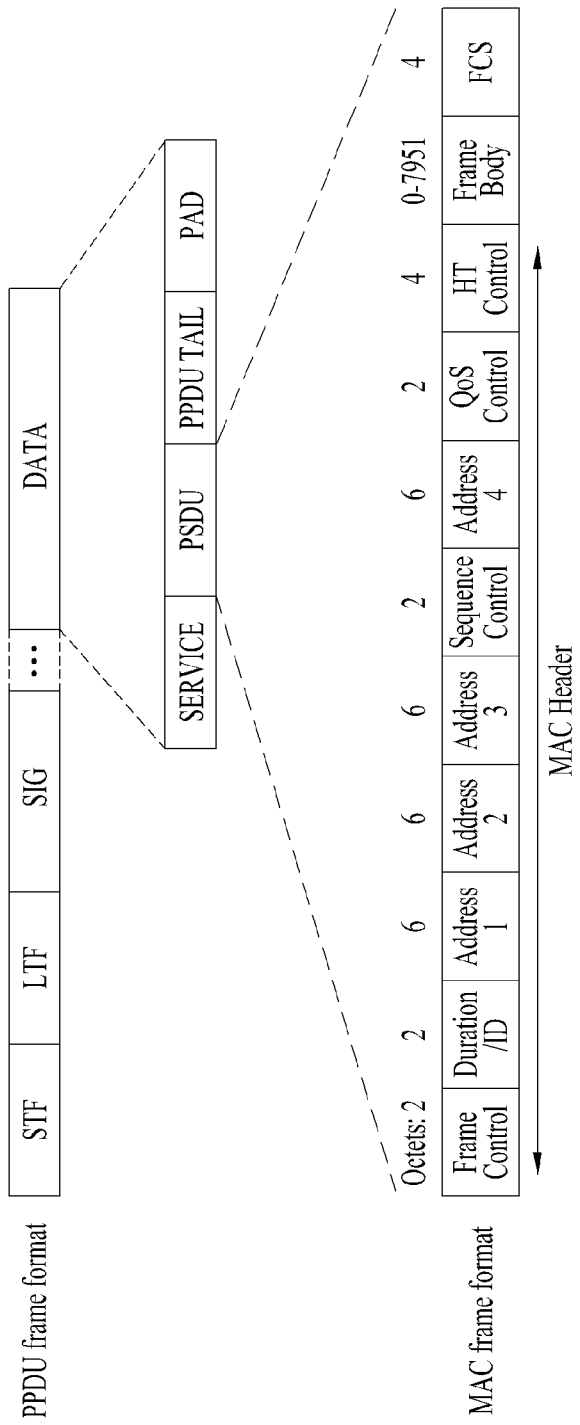
FIG. 14 is a conceptual diagram illustrating a frame structure for use in IEEE 802.11.

FIG. 14 is a diagram for explaining an exemplary frame format used in IEEE 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

A MAC header may include a frame control field, a Duration/ID field, an address field, etc. The frame control field may include control information requisite for frame transmission/reception. The Duration/ID field may be established as a specific time for transmitting the corresponding frame or the like. Four address fields (Address 1, Address 2, Address 3, Address 4) may indicate a Basic Service Set Identifier (BSSID), a Source Address (SA), a Destination Address (DA), a Transmitter Address (TA), a Receiver Address (RA), etc. Only some parts from among four address fields may be included according to frame type.

For example, an 'Address 1' field may be set to a specific value corresponding to a receiver address (RA) of a receiver configured to receive the corresponding MAC frame, and an 'Address 2' field may be set to a specific value corresponding to a transmitter address (TA) of a transmitter configured to transmit the corresponding MAC frame.

If three address fields are used, 'Address 1' field may be set to an RA, and 'Address 2' field may be set to a TA. 'Address 3' field may be set to a BSSID. In case of downlink (DL) (i.e., the case of 'From DS'), the 'Address 3' field may be set to a source address (SA) of the corresponding MAC frame. In case of uplink (UL) (i.e., the case of 'To DS'), the 'Address 3' field may be set to a Destination Address (DA) of the corresponding MAC frame.

If all four address fields are used, the 'Address 1' field may be set to an RA, the 'Address 2' field may be set to a TA, the 'Address 3' field may be set to a DA, and the 'Address 4' field may be set to an SA.

The value of each address field (Address 1, Address 2, Address 3, or Address 4) may be set to an Ethernet MAC address composed of 48 bits.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

APSD Mechanism

An AP capable of supporting APSD (automatic power save delivery) can signal that APSD can be supported using an APSD subfield included in a capability information field of a beacon frame, a probe response frame or an association response frame (or reassociation response frame). An STA capable of supporting APSD can indicate whether operation is performed in an active mode or a PS mode using a power management field included in an FC field of a frame.

APSD is a mechanism for delivering downlink data and a management frame that can be buffered to an STS in PS operation. A power management bit of the FC field of a frame transmitted by an STA in PS mode, which is using APSD, is set to 1 and buffering in an AP can be triggered through the power management bit set to 1.

APSD defines two delivery mechanisms, U-APSD (unscheduled-APSD_ and S-APSD (scheduled-APSD). The STA can use U-APSD to deliver some or all BUs (bufferable units) for an unscheduled service period (SP) and use S-APSD to deliver some or all BUs for a scheduling SP.

According to U-APSD mechanism, to use a U-APSD SP, the STA can inform the AP of a requested transmission duration and the AP can transmit a frame to the STA for the SP. According to U-APSD mechanism, the STA can simultaneously receive a plurality of PSDUs from the AP.

The STA can recognize that the AP has data to be sent thereto through a TIM element of a beacon. Then, the STA can request the AP to transmit while signaling to the AP that the SP of the STA starts by transmitting a trigger frame to the AP at a desired time. The AP can transmit ACK as a response to the trigger frame. Subsequently, the AP can transmit an RTS to the STA through contention, receive a CTS frame from the STA and then transmit data to the STA. Here, the data transmitted by the AP can be composed of one or more data frames. When the AP sets the end of service period (EOSP) of the last data frame to 1 and transmits the last data frame to the STA, the STA can recognize the EOSP and end the SP. Accordingly, the STA can transmit ACK indicating that the STA has successfully received the data. According to the U-APSD mechanism, the STA can start the SP thereof at a desired time to receive data and receive multiple data frames within a single SP, thereby achieving efficient data reception.

The STA may not receive a frame transmitted from the AP for the SP due to interference when using U-APSD. The AP can determine that the STA has not correctly received the frame although the AP may not detect interference. The STA can signal a requested transmission duration to the AP using U-APSD coexistence capability and use the same as an SP for U-APSD. The AP can transmit frames for the SP, and thus the possibility that the STA can receive frames while being interfered can be increased. Furthermore, U-APSD can reduce the possibility that a frame transmitted by the AP for an SP is not successfully received.

The STA can transmit an ADDTS (add traffic stream) request frame including a coexistence element to the AP. The U-APSD coexistence element can include information about a requested SP.

The AP can process the requested SP and transmit an ADDTS response frame as a response to the ADDTS request frame. The ADDTS request frame can include a status code. The status code can indicate response information about the requested SP. The status code can indicate whether the requested SP is permitted or not and also indicate the reason for rejection when the requested SP is rejected.

When the requested SP is permitted by the AP, the AP can transmit frames to the STA for the SP. The duration of the SP can be specified by the U-APSD coexistent element included in the ADDTS request frame. The start of the SP may correspond to a time at which the STA transmits a trigger frame to the AP and the AP successfully receives the same.

The STA can enter a sleep state (or doze state) upon termination of the U-APSD SP.

Slotted Channel Access Scheme

Figure 15:
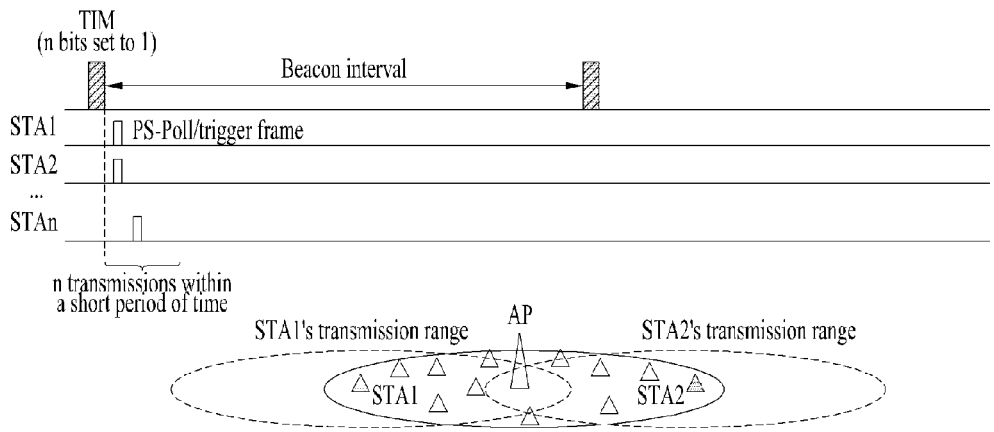
FIG. 15 illustrates a conventional TIM based channel access scheme.

FIG. 15 illustrates a conventional TIM based channel access scheme.

In FIG. 15, an STA corresponding to a bit set to 1 in a TIM element included in a beacon frame can be aware of existence of data to be transmitted thereto within a beacon interval, and thus the STA can transmit a PS-Poll frame or a trigger frame to the AP. In the example of FIG. 15, it is assumed that many (e.g. 2007 or more) STAs are associated with a single AP (e.g. an outdoor smart grid network). Here, if n bits are set to 1 in the TIM element, n STAs (i.e. STA1, STA2, . . . , STAn) attempt to transmit PS-Poll frames or trigger frames to the AP for a short period after transmission of the beacon frame.

In this case, if many STAs are present near the boundary of the coverage of the AP, uplink transmissions of the STAs are hidden. Furthermore, when many bits of the TIM element are set to 1 and thus many STAs transmit PS-Poll frames or trigger frames within a short period after transmission of the beacon frame, collision of transmissions of the STAs increases due to hidden nodes.

To solve this problem, the present invention proposes a slotted channel access scheme. The present invention proposes a method of setting a specific interval (e.g. RAW) in which uplink channel access of fewer STAs is permitted or distributing uplink channel access attempts of a large number of STAs for a long period, thereby reducing collision and improving network performance.

Figure 16:
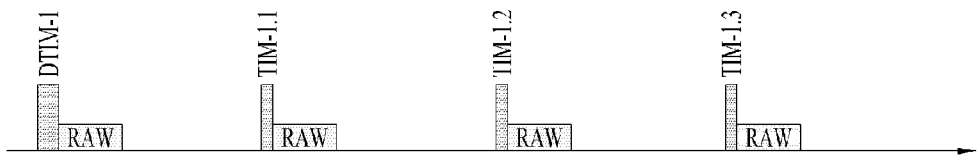
FIG. 16 illustrates a conceptual diagram illustrating a slotted channel access scheme.

FIG. 16 is a conceptual diagram illustrating a slotted channel access scheme.

The AP can distribute information about an AID segment to STAs through DTIM announcement and TIM announcement following the same. A TIM bitmap can be divided into one or more segment blocks and one or more TIM elements can be combined to constitute the entire TIM bitmap. That is, a segment block can correspond to part of the TIM bitmap. The AID segment block included in the DTIM announcement or TIM announcement may include information regarding a segment block offset, a segment block range, a TIM for the AID segment, the duration of RAW, etc., for example. The segment block offset denotes the start point of the AID segment and the segment block range denotes the duration of the AID segment. Accordingly, only STAs (i.e. STAs having AIDs included in the AID segment) covered by the AID segment are allowed to access a channel within the RAW immediately after DTIM or TIM announcement.

A single RAW can be divided into one or more time slots. Different slot durations may be set for RAWs. However, when a single RAW includes a plurality of slots, the plurality of slots can have the same duration. Information on the slot duration of each RAW can be included in a beacon frame and an STA in a doze mode can acquire the slot duration information by waking up at a TBTT (target beacon transmission time) and listening to the beacon frame.

As described above, an STA corresponding to the AID segment provided through DTIM or TIM announcement can recognize that channel access is permitted therefor in a RAW immediately after DTIM or TIM announcement and can be aware of the slot duration of the RAW from slot duration information. Furthermore, if the STA can also be aware of information about RAW duration, the STA can infer or determine how many slots are included in the RAW from the slot duration information and RAW duration information.

Here, the STA can determine a slot in which the STA needs to perform channel access (or channel access is permitted) within the RAW on the basis of the AID bit position thereof. The STA can obtain the AID bit position thereof from a specific information element (IE). In the present invention, such IE is referred to as an RPS (RAW parameter set) IE or a grouping parameter set (GrPS IE) since the same represents a set of parameters necessary for medium access permitted only for a group of STAs.

Figure 17:
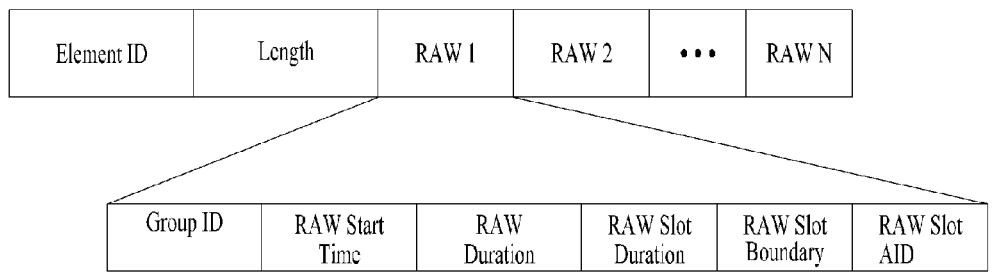
FIG. 17 illustrates an exemplary format of an RPS IE.

FIG. 17 illustrates an exemplary format of the RPS IE.

An element ID field can be set to a value indicating that the corresponding IE is an RPS IE.

A length field can be set to a value indicating the duration of fields following the same. The number of RAW fields (or RAW assignment fields) following the length field can be determined by the value of the length field.

N RAW fields (or RAW assignment fields) can be included in the RPS IE and a single RAW field includes parameters for a single RAW.

Subfields included in a single RAW field illustrated in FIG. 17 will now be described in detail with reference to FIG. 18.

Figure 18:
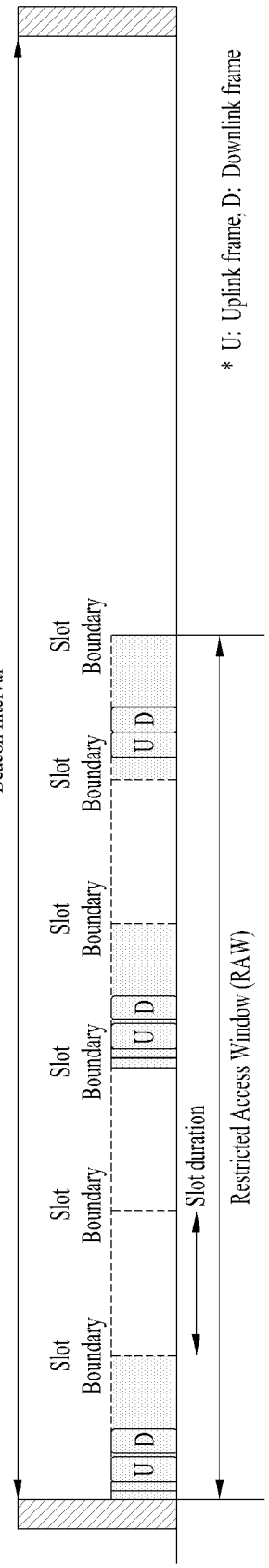
FIG. 18 illustrates an exemplary configuration of a RAW according to the present invention.

FIG. 18 illustrates an exemplary configuration of a RAW according to the present invention.

A group ID field shown in FIG. 17 includes a segment bitmap or a block bitmap and provides identification information of a group permitted to perform channel access in a corresponding RAW. That is, the group ID field can include information on an AID segment block (e.g. an AID segment block start index, a block duration, an AID segment block end index, etc.). Accordingly, the group ID field may also be called a RAW group field.

A RAW start time field shown in FIG. 17 can include information on a start time when medium access of an STA group is permitted. The RAW start time can be represented by a difference (a duration value) between a beacon transmission end time and a RAW start time. The unit of the RAW start time can be a time unit (TU). The TU may be based on microseconds (µs) and can be defined as 1024 µs, for example. If the RAW start time is set to 0, the RAW can start immediately after a beacon frame is ended, as illustrated in FIG. 18.

In FIG. 17, a RAW duration field can include information on a duration for which medium access of the STA group is permitted. The RAW duration corresponds to a difference between the RAW start time and RAW end time and may be represented in TUs.

A RAW slot duration field of FIG. 17 can include information on a duration of each channel access slot included in a RAW. As described above, a single RAW may include a single slot or a plurality of slots. In the latter case, each of the plurality of slots included in the RAW has the same duration. FIG. 18 illustrates a case in which 6 slots having the same duration are defined in a single RAW.

A RAW slot boundary field in FIG. 17 can be set to a value indicating transmission opportunity (TXOP) or whether or not transmission in TXOP is permitted to extend across (or cross) a slot boundary. The slot boundary refers to a reference time setting a boundary between contiguous slots. Accordingly, the RAW slot boundary field may be called a cross-slot boundary field.

When TXOP (or transmission in TXOP) is not permitted to cross the slot boundary, TXOP (or transmission in TXOP) needs to be ended before the slot boundary. In FIG. 18, for example, an STA that attempts channel access in the first slot (i.e. transmits an uplink frame (PS-Poll frame or a trigger frame)) can receive data from the AP through a downlink frame and transmit an ACK frame to the AP in response to the received data. When TXOP (or transmission in TXOP) is not permitted to cross the slot boundary, transmission of the ACK frame needs to be terminated within the corresponding slot. The AP can signal whether or not the above-described TXOP rule is applied (i.e. whether TXOP (or transmission in TXOP) is not permitted to cross the slot boundary) per RAW. When the TXOP rule is applied, the STA need not wait a time corresponding to a probe delay when waking up at the slot boundary.

In FIG. 17, a RAW slot AID field can be set to a value indicating whether only STAs having AIDs set to bit '1' in the TIM element are permitted to perform channel access. That is, the RAW slot AID field can indicate whether channel access (i.e. uplink frame transmission) of only STAs corresponding to AIDs set to bit '1' (that is, paged AIDs) in the TIM bitmap is permitted or whether channel access (i.e. uplink frame transmission) is permitted irrespective of whether bits are set to '1' in the TIM bitmap (i.e. for all paged or unpaged STAs). The RAW slot AID field may also be called an 'access restricted to paged STAs only field'.

The fields included in the GrPS IE or RPS IE of FIG. 17 are exemplary and configuration of fields including the same information as the above-described fields in a different form is within the scope of the present invention. Furthermore, the GrPS IE or RPS IE format proposed by the present invention is not limited to the fields of FIG. 17 and includes some fields of FIG. 17 or additionally includes fields other than the fields of FIG. 17.

The GrPS IE or RPS IE described with reference to FIG. 17 can be transmitted through a beacon frame, a probe response frame, etc. The GrPS IE or RPS IE is broadcast by the AP in the case of transmission through the beacon frame, whereas GrPS IE or RPS IE is unicast by the AP in the case of transmission through the probe response frame.

Slot Assignment

An STA can operate in a doze (or sleep) state prior to a channel access slot allocated thereto. The STA can wake up at the slot boundary of a channel access slot allocated thereto to start EDCA (i.e. contention based channel access).

Here, an STA and a slot to which the STA is allocated are determined as follows.

A channel access slot assigned to an STA can be determined through a modulo operation performed on the AID of the STA and the number of slots of a corresponding RAW. For example, the STA can determine the index $i_{slot}$ of a slot in which channel access start is permitted according to the following equation.

$$i_{slot}=f(AID) \bmod N_{RAW} \qquad \text{[Equation 1]}$$

In Equation 1, f(AID) is a value determined based on the AID of the STA. For example, f(AID) can use the AID of the STA or some bits of the AID.

In Equation 1, $N_{RAW}$ denotes the number of slots of the corresponding RAW and can be calculated by $N_{RAW}=T_{RAW}/T_{slot}$. Here, $T_{RAW}$ denotes a RAW duration and $T_{slot}$ denotes a slot duration.

In addition, mod refers to a modulo operation and A mod B represents a remainder obtained by dividing A by B. A mod B may be represented as A % B.

In Equation 1, full AID of the STA can replace the AID for f(AID). Otherwise, partial AID can replace the AID for f(AID). The partial AID is a non-unique identifier of the STA and can be determined by a Hashing function using some bits of the full AID.

When the partial AID is used in slot allocation, slots may be allocated such that a plurality of STAs (e.g. STAs having contiguous AID values) each use the same channel access slot. For example, f(AID) can be determined based on AID[a:b] in Equation 1. Here, AID[a:b] denotes bit[a] to bit[b] of a binary AID. The value of a or b can be provided to each slot by the AP.

For example, if slot allocation is determined using AID [3:12], AID[3:12] represents bit #3 to bit #12 in a 14-bit AID (from bit #0 to bit #13). In this case, all STAs having the same values for bit #3 to bit #12 can be permitted to perform channel access in the corresponding slot.

In the example illustrated in FIG. 20, which will be described below, when a RAW is restrictively allocated to STAs (i.e. paged STAs) having AIDs with bits set to '1' in a TIM bitmap, f(AID) in Equation 1 may be determined based on position indices of the AID bits in the TIM element. That is, when 4 bits (i.e. first, third, sixth and ninth bits) are set to '1' in the TIM bitmap in the example of FIG. 20, the position index of AID1 corresponding to the first bit can be 1, the position index of AID3 corresponding to the third bit can be 2, the position index of AID6 corresponding to the sixth bit can be 3 and the position index of AID9 corresponding to the ninth bit can be 4. That is, when AIDs having bits set to '1' in the TIM element are aligned in ascending order, the order values can correspond to the above position indices. Accordingly, an STA having AID1 can be assigned the first slot in the RAW, an STA having AID3 can be assigned the second slot in the RAW, an STA having AID6 can be assigned the third slot in the RAW and an STA having AID9 can be assigned the fourth slot in the RAW.

When f(AID) uses the AID (or partial AID) of an STA, as described above, f(AID) may be used when the RAW is not restrictively allocated to only STAs (e.g. paged STAs) having AIDs set to bit '1' in the TIM bitmap. That is, when channel access in the RAW is allowed for any STAs (e.g. all STAs irrespective of paging), slots in the RAW, which are allocated to the STAs, can be determined based on the AIDs of the STAs.

Information about slot allocation, as described above, may be additionally included in the GrPS IE or RPS IE of FIG. 17 (in the form of a slot assignment field, for example).

Exemplary Slotted Channel Access Operation

Figure 19:
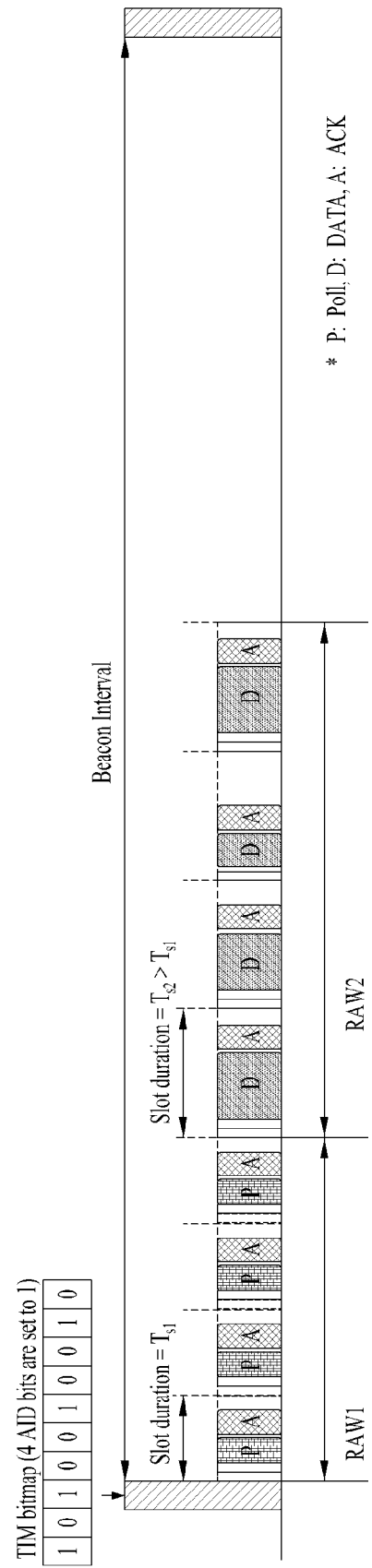
FIG. 19 illustrates an exemplary slotted channel access scheme according to the present invention.

FIG. 19 illustrates exemplary slotted channel access.

In the example of FIG. 19, it is assumed that a GrPS IE or RPS IE with respect to RAW1 indicates that channel access in RAW1 is permitted only for STAs that satisfy the following conditions.

RAW slot AID field: indicating application of restriction according to TIM element bit value corresponding to AIDs of STAs (i.e. permission of only channel access of STAs (i.e. paged STAs) having AID bits set to '1' in the TIM element). In FIG. 19, channel access in RAW1 is permitted only for STAs having AIDs corresponding to the first, third, sixth and ninth bits in the TIM bitmap.

RAW slot duration field: set to $T_{s1}$ (here, $T_{s1}$=PS-Poll frame duration+SIFS+ACK frame duration or $T_{s1}$=null data trigger frame duration+SIFS+ACK frame duration).

RAW slot boundary field: indicating that TXOP (or transmission in TXOP) is not permitted to cross a slot boundary.

Under the above conditions, RAW1 in FIG. 19 can be used only for a PS-Poll frame or a null-data trigger frame.

In the example of FIG. 19, it is assumed that a GrPS IE or RPS IE with respect to RAW2 indicates that channel access in RAW2 is permitted only for STAs that satisfy the following conditions.

RAW slot AID field: indicating application of restriction according to TIM element bit value corresponding to AIDs of STAs (i.e. permission of only channel access of STAs (i.e. paged STAs) having AID bits set to '1' in the TIM element). In FIG. 19, channel access in RAW2 is permitted only for STAs having AIDs corresponding to the first, third, sixth and ninth bits of the TIM bitmap.

RAW slot duration field: set to $T_{s2}$ (here, $T_{s2} \geq$ data frame duration+SIFS+ACK frame duration).

RAW slot boundary field: indicating that TXOP (or transmission in TXOP) is not permitted to cross a slot boundary.

Under the above conditions, RAW2 in FIG. 19 can be used for the AP to transmit data frames to STAs having AIDs corresponding to bit '1' in the TIM bitmap.

Figure 20:
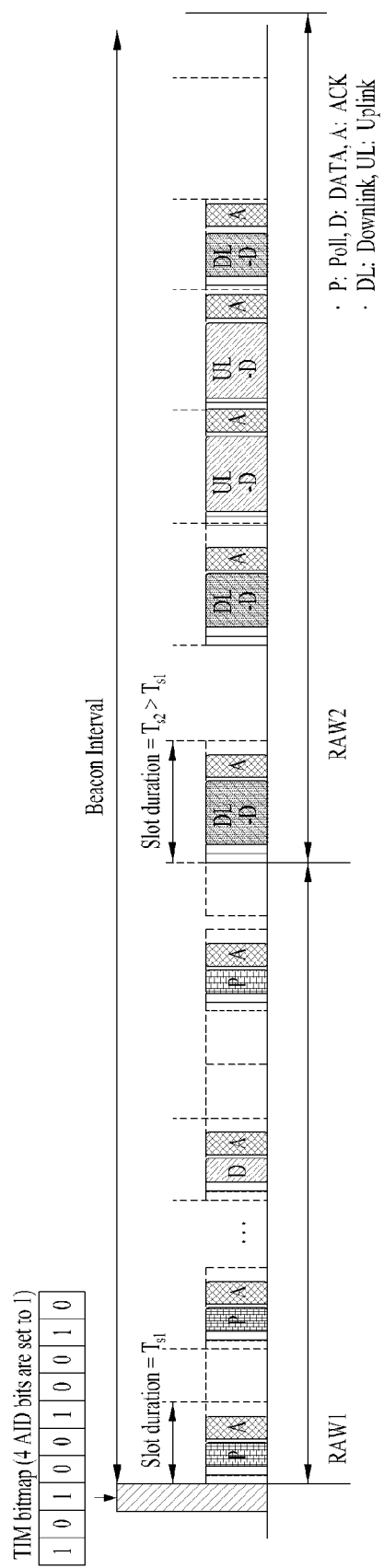
FIG. 20 illustrates another exemplary slotted channel access scheme according to the present invention.

FIG. 20 illustrates another exemplary slotted channel access scheme according to the present invention.

In the example of FIG. 20, it is assumed that a GrPS IE or RPS IE with respect to RAW1 indicates that channel access in RAW1 is permitted only for STAs that satisfy the following conditions.

RAW slot AID field: indicating that restriction according to TIM element bit value corresponding to AIDs of STAs is not applied (i.e. channel access of all STAs is permitted in RAW1 irrespective of whether AID bits of STAs are set to '1' in the TIM bitmap (i.e. whether the STAs are paged)). In FIG. 20, channel access in RAW1 is permitted for not only STAs having AIDs corresponding to the first, third, sixth and ninth bits in the TIM bitmap but also other STAs.

RAW slot duration field: set to $T_{s1}$ (here, $T_{s1}$=PS-Poll frame duration+SIFS+ACK frame duration or $T_{s1}$=null data trigger frame duration+SIFS+ACK frame duration).

RAW slot boundary field: indicating that TXOP (or transmission in TXOP) is not permitted to cross a slot boundary.

Under the above conditions, RAW1 in FIG. 20 can be used for a PS-Poll frame or a null-data trigger frame of any STA or any small control frames.

In the example of FIG. 20, it is assumed that a GrPS IE or RPS IE with respect to RAW2 indicates that channel access in RAW2 is permitted only for STAs that satisfy the following conditions.

RAW slot AID field: indicating that restriction according to TIM element bit value corresponding to AIDs of STAs is not applied (i.e. channel access of all STAs is permitted in RAW1 irrespective of whether AID bits of STAs are set to '1' in the TIM bitmap (i.e. whether the STAs are paged)). In FIG. 20, channel access in RAW2 is permitted for not only STAs having AIDs corresponding to the first, third, sixth and ninth bits in the TIM bitmap but also other STAs.

RAW slot duration field: set to $T_{s2}$ (here, $T_{s2} \geq$ data frame duration+SIFS+ACK frame duration).

RAW slot boundary field: indicating that TXOP (or transmission in TXOP) is not permitted to cross a slot boundary.

Under the above conditions, RAW2 in FIG. 20 can be used for the AP or any STA to transmit data frames to any STA or the AP.

Backoff Mechanism in Slotted Channel Access

Upon reception of a beacon frame, an STA can check whether a buffered frame that needs to be received is present through a TIM included in the beacon frame. To receive the buffered frame, the STA can transmit a PS-Poll frame or a trigger frame to the AP.

The slotted channel access mechanism proposed by the present invention can involve configuration of an RW by the AP. Only STAs allowed to perform transmission in a specific RAW can carry out channel access in the RAW. A RAW can be configured through an RPS IE or GrPS IE, as described above.

A RAW can be divided into one or more slots and STAs allowed to perform transmission in the RAW can start contention based channel access in slots allocated thereto.

When a RAW is set within a beacon interval, as illustrated in FIG. 18, an STA can start contention-based channel access through DCF (or EDCA) in a slot allocated thereto. The AP can set a TXOP rule in slots while configuring the RAW. When the RAW slot boundary field (or cross slot boundary field) is set to "not allowed", TXOP or frame transmission in TXOP is not permitted to cross a slot boundary. In this case, frame transmission in TXOP of the STA cannot be performed in slots other than the slot allocated to the STA.

When STAs are allocated slots in which channel access is allowed by the AP, the STAs need to perform contention in order to transmit PS-Poll frames, trigger frames or uplink data frames. The present invention proposes contention-based channel access in a special situation in which a RAW (and/or slots) is allocated, distinguished from normal contention-based channel access.

An STA allocated a slot in a RAW by the AP can check channel state in a DIFS or AIFS (arbitration inter-frame space) to perform contention in the slot assigned thereto, similarly to a DCF or EDCA mechanism. When the corresponding is idle, the STA can select a backoff counter, wait for a backoff slot (discriminated from a slot in the RAW) time corresponding to the backoff counter and attempt transmission. The backoff counter is a pseudo-random integer and can be determined as one of values uniformly distributed in the range of 0 to CW. Here, CW is a contention window parameter value. While CWmin is given as the initial value of CW, CWmin can be doubled in the case of transmission failure (e.g. occurrence of collision can be considered when ACK for a transmitted frame is not received). When CW reaches CWmax, the STA can attempt data transmission while maintaining CWmax until data transmission is successfully performed. CWmax is set to CWmin upon successful data transmission. CW, CWmin and CWmax are preferably set to $2^n-1$ (n=0, 1, 2, ... ).

Upon start of a backoff procedure, the STA continuously monitor a medium while counting down the backoff slot according to the backoff count value determined in the range of 0 to CW. When the medium is busy, the STA stops countdown and waits. When the medium is in an idle state, the STA resumes countdown.

When a conventional contention-based channel access mechanism (or backoff mechanism) is applied to slotted channel access, the backoff procedure can be performed as follows.

If the cross-slot boundary field is set to "not allowed", the duration of the slot allocated to the STA may expire before the backoff procedure is completed (i.e. before backoff countdown is successfully completed to obtain TXOP). In this case, since channel access is not allowed for the STA in the next slot, the STA sets NAV in slots that are not allocated thereto to regard the channel (or medium) as busy and does not attempt channel access. Furthermore, the STA suspends the backoff procedure (or backoff countdown) for slots in which channel access of the STA is not allowed (i.e. stops backoff countdown while maintaining the backoff count value without changing the same).

In this case, the RAW includes multiple slots and channel access may be deferred for STAs performing backoff procedures due to expiration of durations of slots corresponding to the STAs. NAV values for these STAs are changed from "busy" to "idle" at the RAW end time (or NAV is reset or cancelled), and thus the STAs simultaneously resume the backoff procedures. Here, since the STAs perform backoff countdown in slots allocated thereto and suspend backoff countdown in slots in which channel access is not allowed therefor, the probability that backoff count values stored in the STAs for the backoff procedures in the RAW belong to similar ranges is high. In this case, when the STAs simultaneously resume the backoff procedures at the RAW end time (i.e. when all STAs can perform channel access without restriction), the probability of collision of channel access between STAs remarkably increases.

To solve this problem, when a RAW is configured for an STA and the cross slot boundary field is set to "not allowed", if the STA cannot acquire TXOP due to expiration of slot duration while performing a backoff procedure in a slot allocated thereto, the STA can set CW as an initial contention window and determine a value selected from values uniformly distributed in the range of 0 to CW as a backoff count value in order to recover the backoff count thereof according to the present invention. At the RAW end time, the STA can resume the backoff procedure according to the recovered backoff count value.

A plurality of slots included in a RAW may be allocated to a single STA. For example, slots M and N contiguous or non-contiguous in the time domain can be allocated to the STA. In this case, the STA does not recover backoff count until all durations of the plurality of slots allocated thereto in the RAW expire. For example, when the STA does not acquire TXOP due to slot duration expiration during a backoff procedure in the slot M, the STA can maintain the backoff count value when the RAW is not ended and start backoff counting from the maintained backoff count value to resume backoff countdown in the slot N allocated thereto. If the STA cannot obtain TXOP due to slot duration expiration during the backoff procedure in the slot N, the STA can suspend backoff countdown. If the RAW is ended (i.e. at a time when channel access is allowed for all STAs), the STA can recover the maintained backoff count value to select a new backoff count value and start a new backoff procedure.

If the initial contention window has a large initial value or a small number of STAs is allocated to slots in the RAW when STAs select backoff counts in the RAW, the probability that collision of channel access of STAs occurs may not be high even if backoff counts of STAs are not newly set at the RAW end time. In this case, recovery of backoff counts of STAs may be inefficient since backoff count recovery may cause additional power consumption. Accordingly, a predetermined threshold with respect to the initial contention window value related to backoff count selection in the RAW and/or a predetermined threshold with respect to the number of STAs allocated to slots are set, backoff count recovery is performed at the RAW end time only when the initial contention window value and/or the number of STAs allocated to slots are greater than the thresholds, and the backoff procedure is resumed at the RAW end time using the suspended backoff count value when an initial contention window value and/or the number of STAs allocated to slots are less than the thresholds.

Figure 21:
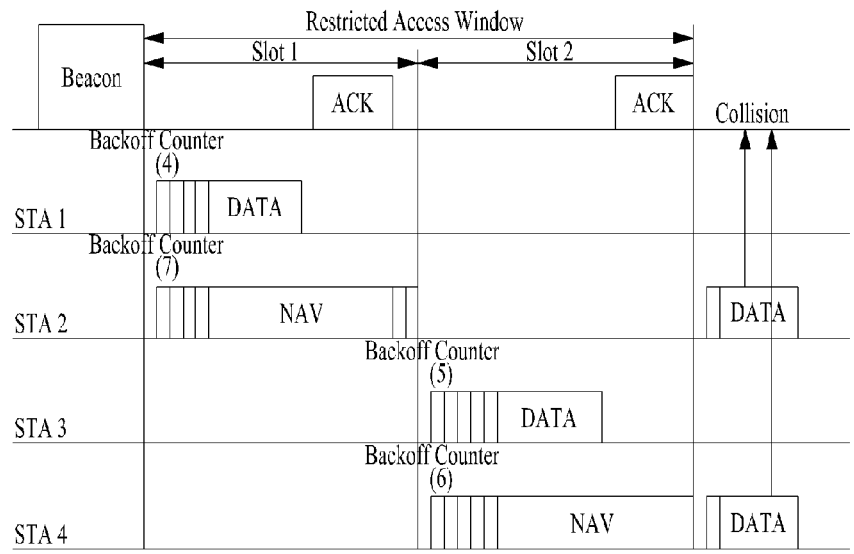
FIG. 21 illustrates an exemplary backoff process in slotted channel access.

FIG. 21 illustrates an exemplary backoff procedure in slotted channel access.

In FIG. 21, it is assumed that a RAW includes 2 slots (slot 1 and slot 2), STA1 and STA2 are permitted to perform channel access in slot 1 and STA3 and STA4 are allowed to perform channel access in slot 2.

It is assumed that STA1 and STA2 respectively select 4 and 7 as initial backoff count values in slot 1. STA1 transmits a data frame first after the lapse of 4 backoff slots. STA2 sets a NAV according to data frame transmission of STA1 (e.g. according to a duration field value of the data frame) and suspends backoff countdown without attempting channel access until channel access (i.e. data frame transmission and ACK frame reception) of STA1 is completed (that is, STA2 counts down the backoff count value to 3 and then no longer performs backoff countdown). Upon completion of channel access of STA1, STA2 resumes backoff countdown. Here, it is assumed that the duration of slot 1 expires before backoff countdown of STA2 is completed (i.e., when the backoff count value of STA2 is counted down to 1 and does not reach 0). In this case, STA2 cannot perform channel access in the RAW and can resume the backoff procedure at the RAW end time.

It is assumed that STA3 and STA4 respectively select 5 and 6 as initial backoff count values in slot 2. STA3 transmits a data frame first after the lapse of 5 backoff slots. STA4 sets a NAV according to data frame transmission of STA3 (e.g. according to a duration field value of the data frame) and suspends backoff countdown without attempting channel access until channel access (i.e. data frame transmission and ACK frame reception) of STA3 is completed (that is, STA4 counts down the backoff count value to 1 and then not longer performs backoff countdown any more). It is assumed that the duration of slot 2 expires upon completion of channel access of STA3. In this case, STA4 cannot perform channel access in the RAW and can resume the backoff procedure at the RAW end time.

STA2 and STA4 simultaneously resume the backoff procedures at the RAW end time. Here, if STA2 and STA4 use backoff count values stored for the backoff procedures in the RAW, STA2 and STA4 have the same backoff count value of 1 and thus STA2 and STA4 perform data frame transmission after the lapse of one backoff slot, causing collision.

To solve this problem, an STA allocated a slot in the RAW can recover the backoff count value at the RAW end time and perform a new backoff procedure when the STA cannot transmit a frame while performing backoff countdown in the corresponding slot according to the present invention.

Figure 22:
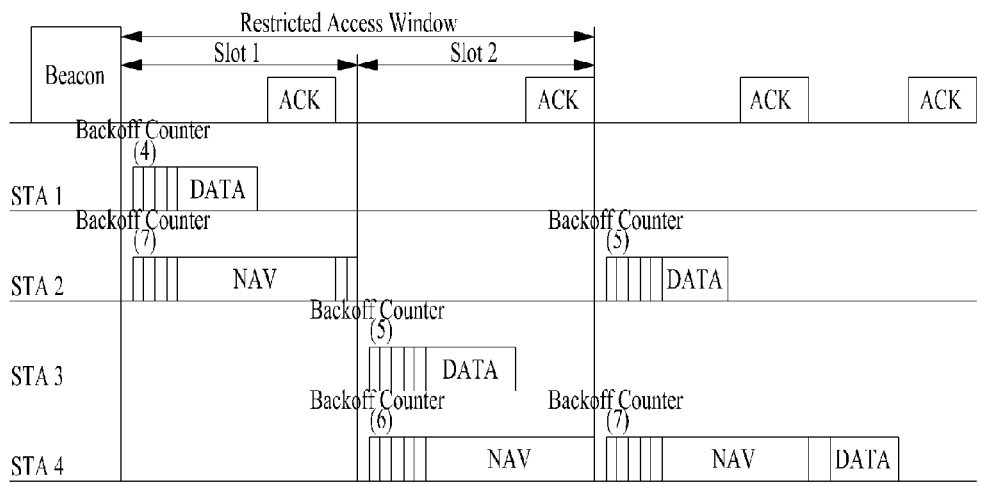
FIG. 22 illustrates an exemplary backoff process in slotted channel access according to the present invention.

FIG. 22 illustrates another exemplary backoff procedure in slotted channel access according to the present invention.

In the example of FIG. 22, it is assumed that a RAW includes 2 slots (slot 1 and slot 2), STA1 and STA2 are permitted to perform channel access in slot 1 and STA3 and STA4 are allowed to perform channel access in slot 2 as in the example of FIG. 21. In addition, it is assumed that backoff procedures and channel access operations of the STAs in the slots within the RAW are performed in the same manner as in FIG. 21 and thus a redundant description is omitted.

In the example of FIG. 22, backoff procedures of STA2 and STA4 are different from those of FIG. 21 after termination of the RAW.

Specifically, STA2 and STA4 start the backoff procedures at the RAW end time by selecting new backoff count values rather than using backoff count values stored (or suspended) for the backoff procedures in the RAW. In other words, a backoff count value (or a backoff function state or a backoff state applied within the RAW) used by an STA for a backoff procedure within the RAW and a backoff count value (or a backoff function state or a backoff state applied outside the RAW) used for a backoff procedure outside the RAW are separately or independently stored and the backoff procedures within the RAW and outside the RAW are independently performed according to the backoff count values.

In the example of FIG. 22, it is assumed that STA2 and STA4 respectively select 5 and 7 as initial backoff count values at the RAW end time. STA2 transmits a data frame first after the lapse of 5 backoff slots. STA4 sets a NAV according to data frame transmission of STA2 (e.g. according to a duration field value of the data frame) and suspends backoff countdown without attempting channel access until channel access (i.e. data frame transmission and ACK frame reception) of STA2 is completed (that is, STA4 counts down the backoff count value to 1 and then no longer performs backoff countdown). Upon completion of channel access of STA2, STA4 resumes backoff countdown, transmits a data frame when the backoff count value reaches 0 and receives an ACK frame in response to the data frame.

Additionally, when the duration of a frame that an STA attempts to transmit exceeds a remaining duration of a RAW slot allocated to the STA (or overlaps with the slot boundary) although the STA has acquired TXOP since the backoff count value of the STA reaches 0 before the duration of the RAW slot expires, the STA does not perform channel access (or TXOP process). In this case, when the STA starts a backoff procedure at the RAW end time, the STA can determine an additional backoff count value (e.g. set CW as an initial contention window and then select one of values uniformly distributed in the range of 0 to CW as a backoff count value) and perform channel access, instead of using the backoff count value stored for a backoff procedure within the RAW.

Figure 23:
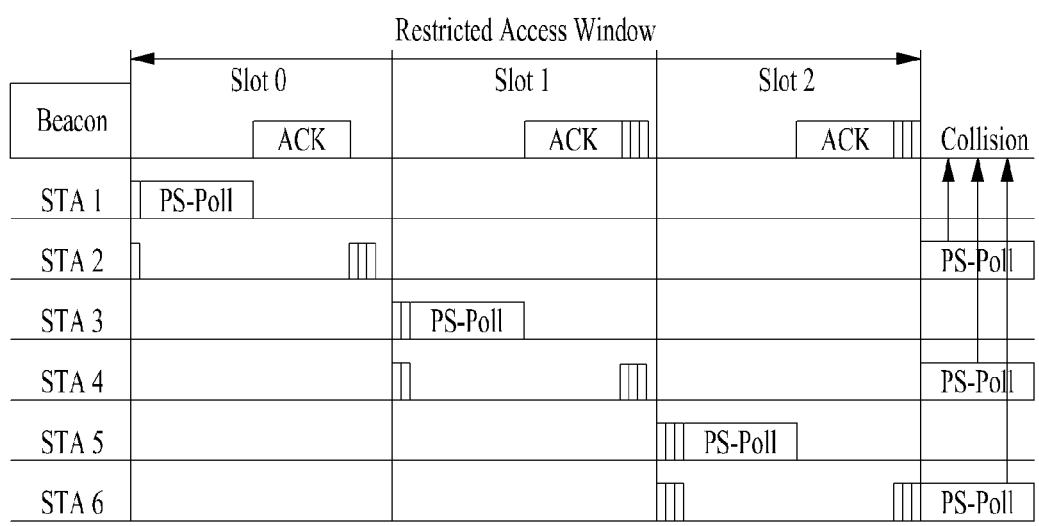
FIG. 23 illustrates another exemplary backoff process in slotted channel access.

FIG. 23 illustrates another exemplary backoff procedure in slotted channel access.

In the example of FIG. 23, it is assumed that STA1, STA2, STA3, STA4, STA5 and STA6 are paged and a RAW is assigned. Here, Slot 0 is allocated to STA1 and STA2, Slot 1 is allocated to STA3 and STA4 and Slot 2 is allocated to STA5 and STA6. In addition, the RAW has a value of 8 and STA1, STA2, STA3, STA4, STA5 and STA6 respectively have backoff timers 1, 4, 2, 5, 3 and 6.

The backoff counter of STA1 reaches 0 first in Slot 0 and thus STA1 can transmit a PS-Poll frame and receive ACK for the PS-Poll frame. STA2 checks whether the corresponding channel is idle, resumes backoff countdown and attempts to transmit a PS-Poll frame when the backoff counter reaches 0 before expiration of the duration of Slot 0. However, STA2 cannot transmit the PS-Poll frame since it is expected that transmission of the PS-Poll frame extends across the boundary of the next slot (i.e. Slot 1 that is not allocated to STA2). Accordingly, STA2 can defer transmission of the PS-Poll frame to the RAW end time.

The backoff counter of STA3 reaches 0 first in Slot 1 and thus STA3 can transmit a PS-Poll frame and receive ACK for the PS-Poll frame. STA4 checks whether the channel is idle, resumes backoff countdown and attempts to transmit a PS-Poll frame when the backoff counter reaches 0 before expiration of the duration of Slot 1. However, STA4 cannot transmit the PS-Poll frame since it is expected that transmission of the PS-Poll frame extends across the boundary of the next slot (i.e. Slot 2 that is not allocated to STA4). Accordingly, STA4 can defer transmission of the PS-Poll frame to the RAW end time.

The backoff counter of STA5 reaches 0 first in Slot 2 and thus STA5 can transmit a PS-Poll frame and receive ACK for the PS-Poll frame. STA6 checks whether the channel is idle, resumes backoff countdown and attempts to transmit a PS-Poll frame when the backoff counter thereof reaches 0 before expiration of the duration of Slot 2. However, STA6 cannot transmit the PS-Poll frame since it is expected that transmission of the PS-Poll frame cannot be performed in Slot 2 due to termination of the RAW. Accordingly, STA6 can defer transmission of the PS-Poll frame to the RAW end time.

STA2, STA4 and STA6 can transmit the PS-Poll frames at the RAW end time. However, when STA2, STA4 and STA6 use the backoff counter used for backoff procedures within the RAW for PS-Poll frame transmission, STA2, STA4 and STA6 simultaneously transmit the PS-Poll frames since the backoff counters thereof have reached 0, resulting in collision. To solve this problem, STA2, STA4 and STA6 can perform backoff procedures outside the RAW using backoff counters different from the backoff counters used for the backoff procedures within the RAW, thereby reducing possibility of collision.

Figure 24:
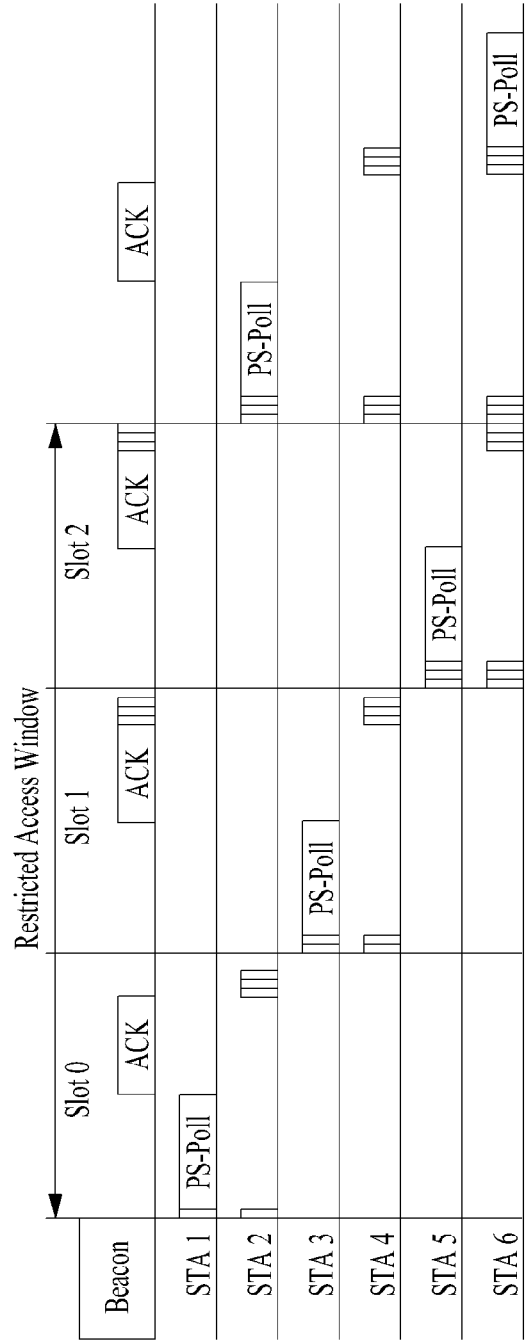
FIG. 24 illustrates another exemplary backoff process in slotted channel access according to the present invention.

FIG. 24 illustrates another exemplary backoff procedure in slotted channel access according to the present invention.

The example of FIG. 24 assumes a situation similar to the example of FIG. 23. However, FIG. 24 illustrates a case in which the backoff counters used within the RAW are not applied after termination of the RAW and backoff operation according to backoff counters different from the backoff counters used within the RAW is performed outside the RAW.

Operations of STAs within the RAW correspond to those in the example of FIG. 23 and description thereof is thus omitted.

Upon termination of the RAW, STA2 can perform backoff countdown using a backoff counter (e.g. 3) different from the backoff counter applied within the RAW. Similarly, STA4 and STA6 can perform backoff countdown using backoff counters (e.g. 7 for STA4 and 6 for STA6) different from the backoff counters applied within the RAW upon termination of the RAW. In this case, the backoff counter of STA2 reaches 0 first and thus STA2 can transmit a PS-Poll frame and receive ACK for the PS-Poll frame. Then, the backoff counter of STA6, 6, reaches 0 at the RAW end time and thus STA6 can transmit a PS-Poll frame. After PS-Poll frame transmission and ACK reception of STA6 is completed, STA4 resumes backoff countdown and transmits a PS-Poll frame when the backoff counter thereof reaches 0, which is not shown in FIG. 24.

As described above, it is possible to control a backoff function state applied within the RAW and a backoff function state applied outside the RAW, that is, two different backoff function states to be separately or independently maintained and managed, thereby improving channel (or medium) access fairness of STAs and network resource utilization efficiency.

According to the present invention, a plurality of independent backoff function states can be set in relation to configuration of a RAW.

For example, it is assumed that a RAW is assigned to an STA which is performing a channel access procedure (or backoff procedure) according to EDCA in a common access window (i.e. an interval in which the RAW is not set). In this case, a backoff function state, which is applied outside the RAW before the RAW is assigned, is referred to as a first backoff function state and a backoff function state, which is applied within the RA after the RAW is assigned, is referred to as a second backoff function state.

Specifically, the first backoff function state corresponds to a backoff counter (or backoff count value) used in a common access window (i.e. an interval in which channel access can be performed without restriction) other than the RAW, a contention window parameter (e.g. a minimum contention window, a maximum contention window, retransmit limit, etc.), etc.

The second backoff function state corresponds to a backoff counter (or backoff count value) used for channel access according to EDCA within the RAW, a contention window parameter (e.g. a minimum contention window, a maximum contention window, retransmit limit, etc.), etc.

When the AP sets or assigns a RAW through a beacon frame, the AP can designate contention window parameters (e.g. a minimum contention window, a maximum contention window, retransmit limit, etc.) with respect to the second backoff function state applied within the RAW according to access category. The access category may refer to access priority set to provide predetermined service quality. That is, the access category can be set per STA, and thus parameters applied outside the RAW can be different from parameters applied within the RAW for each STA. Accordingly, parameters included in the first backoff function state can be different from parameters included in the second backoff function state and it is preferable to separately maintain and manage backoff function states used in the common access window and the RAW.

A backoff procedure of an STA based on the above description will now be described.

The STA suspends a previous backoff process and stores the first backoff function state at the RAW start time.

When the STA participates in the RAW, the STA invokes a new backoff function using RAW backoff parameters (e.g. the second backoff function state).

When a cross-slot boundary is not allowed, the STA can perform backoff countdown only in a slot allocated thereto within the RAW. If the cross-slot boundary is allowed, the STA can continue backoff countdown even after termination of the slot allocated thereto.

Upon termination of the RAW, the stored first backoff function state is restored and thus the backoff function is resumed.

Figure 25:
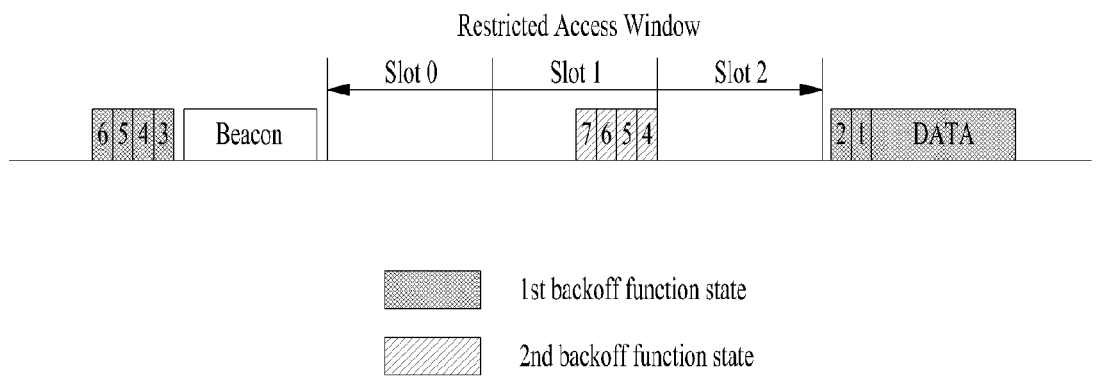
FIG. 25 illustrates another exemplary backoff process in slotted channel access according to the present invention.

FIG. 25 illustrates another exemplary backoff procedure in slotted channel access according to the present invention.

In the example of FIG. 25, it is assumed that an STA performs a backoff procedure according to EDCA using first backoff function state parameters in order to transmit an uplink data frame. The STA selects 6 as a first backoff count value and counts down backoff slots in the order of 6, 5, 4, 3, . . . . When the backoff count value reaches 3, the STA can receive a beacon frame from the AP and recognize that a RAW is assigned thereto from information included in the beacon frame.

When the AP allocates Slot 1 in which channel access is allowed within the RAW to the STA, the STA can perform a backoff process in Slot 1 to access a channel. Here, the STA stores the first backoff function state parameters used before the RAW starts, that is, a backoff counter (or backoff count value), contention window parameters (e.g. minimum contention window, maximum contention window, retransmit limit, etc.), etc. The first backoff function state parameters can be stored according to access category when EDCA is used.

In Slot 1 within the RAW, the backoff procedure is performed according to the second backoff function state instead of the first backoff function state used outside the RAW. That is, while the backoff count value of the first backoff function state reaches 3 before the RAW, backoff countdown is performed according to a different backoff count value within the RAW. For example, the backoff count value can be counted down from 7 for the second backoff function state applied within the RAW.

The duration of Slot 1 may expire while the STA counts down the backoff count value in the order of 7, 6, 5, 4, . . . . Here, when the AP imposes restrictions on the STA such that the STA cannot continue the backoff procedure crossing a slot boundary (e.g. when the cross slot boundary is set to "not allowed"), the STA no longer attempts channel access within the RAW.

At the RAW end time, the STA can restore the first backoff function state stored therein to resume channel access after the RAW. Accordingly, the STA can count down the backoff count value from 3 corresponding to the last backoff count value before the RAW starts.

It is possible to consider a case in which the first backoff function state stored in the STA is not present at the RAW end time (e.g. a case in which the STA has not performed a backoff procedure before the RAW is assigned thereto). In this case, the first backoff function state can be set as a new backoff function state instead of the second backoff function state used within the RAW, a new backoff count value can be selected and a backoff procedure outside the RAW can be performed according to the new backoff count value.

Figure 26:
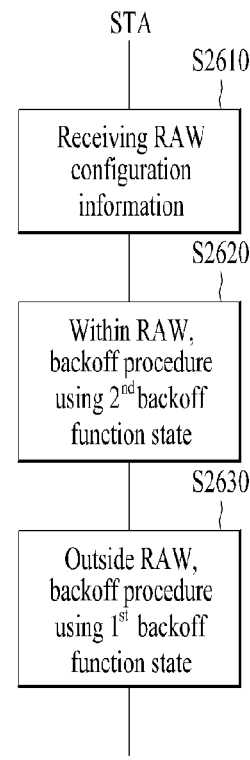
FIG. 26 illustrates a channel access method according to the present invention.

FIG. 26 illustrates a channel access method according to the present invention.

An STA can receive RAW configuration information from an AP in step S2610. For example, the RAW configuration information can be provided as an RPS element included in a beacon frame.

The STA can perform a backoff procedure using a second backoff function state within a RAW in step S2620.

The STA can perform a backoff procedure using a first backoff function state outside the RAW (e.g. after or before the RAW) in step S2630.

In FIG. 26, the STA can maintain/manage a plurality of backoff function states (e.g. the first backoff function state and the second backoff function state) separately/independently.

While the exemplary method illustrated in FIG. 26 is represented as series of operations for clarity of description, the order of the steps is not limited thereto and the steps may be performed simultaneously or in a different order as necessary. In addition, all the steps illustrated in FIG. 26 are not necessarily used to implement the method proposed by the present invention.

In the method illustrated in FIG. 26, the above-described embodiments of the present invention can be independently applied or two or more thereof can be simultaneously applied.

Figure 27:
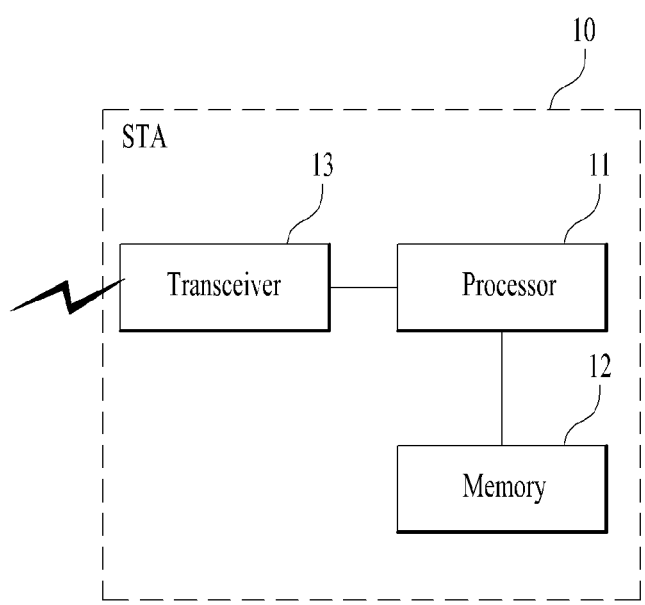
FIG. 27 is a block diagram illustrating a configuration of a radio device according to an embodiment of the present invention.

FIG. 27 is a block diagram of a radio device according to an embodiment of the present invention.

An STA 10 may include a processor 11, a memory 12 and a transceiver 13. The transceiver 13 can transmit/receive a radio signal and implement a physical layer according to IEEE 802, for example. The processor 11 can be connected to the transceiver 13 to implement a physical layer and/or a MAC layer according to IEEE 802. The processor 11 can be configured to perform operations according to the above-described embodiments of the present invention. In addition, modules for implementing operations of the STA according to the above-described embodiments of the present invention can be stored in the memory 12 and executed by the processor 11. The memory 12 can be included in the processor 11 or provided outside the processor 11 and connected to the processor 11 by known means.

In FIG. 27, the STA 10 can be configured to perform channel access according to the present invention. The processor 11 can be configured to receive RAW configuration information from an AP using the transceiver 13. In addition, the processor 11 can be configured to perform a backoff procedure using a second backoff function state within a RAW and carry out a backoff procedure using a first backoff function state outside the RAW (e.g. after or before the RAW). Furthermore, the memory 12 can store a plurality of backoff function states (e.g. the first backoff function state and the second backoff function state).

The configuration of the STA can be implemented such that the above-described embodiments of the present invention can be independently applied or two or more thereof can be simultaneously applied.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described embodiments of the present invention are based on IEEE 802.11, the present invention is applicable to various mobile communication systems.

What is claimed is:

1. A method for performing channel access by a station (STA) in a Wireless Local Area Network (WLAN) system, the method comprising:
receiving restricted access window (RAW) configuration information for the STA from an access point (AP);
performing a first backoff procedure using a first backoff function state before the RAW;
performing a second backoff procedure using a second backoff function state for channel access within the RAW, wherein the first backoff procedure is suspended and the first backoff function state is stored at a start of the RAW; and
resuming the first backoff procedure using the stored first backoff function state at an end of the RAW,
wherein the STA maintains a plurality of backoff function states including the first backoff function state used outside the RAW and the second backoff function state used within the RAW.

2. The method according to claim 1, wherein, when the first backoff function state is not stored, the backoff procedure performed at the end of the RAW is invoked as a new backoff procedure.

3. The method according to claim 1, wherein, when the RAW configuration information does not allow a cross-slot boundary, a backoff countdown is performed only in one or more slots allocated to the STA within the RAW.

4. The method according to claim 1, wherein, when the RAW configuration information allows the cross-slot boundary, a backoff countdown is performed after a slot allocated to the STA within the RAW.

5. The method according to claim 1, wherein, when the RAW configuration information allows the cross-slot boundary, a backoff countdown begun prior to the cross-slot boundary is continued after the cross-slot boundary.

6. The method according to claim 1, wherein the backoff procedure using one of the first and second backoff function states is performed based on enhanced distributed channel access (EDCA).

7. A station (STA) performing channel access in a Wireless Local Area Network (WLAN) system, comprising:
a transceiver;
a processor; and
a memory, wherein the processor:
  receives restricted access window (RAW) configuration information for the STA from an AP using the transceiver;
  performs a first backoff procedure using a first backoff function state for channel access before the RAW; and
  performs a second backoff procedure using a second backoff function state for channel access within the RAW, wherein the processor suspends the first backoff procedure and stores the first backoff function state at a start of the RAW; and
  resumes the first backoff procedure using the stored first backoff function state at an end of the RAW,
wherein the memory stores a plurality of backoff function states including the first backoff function state used outside the RAW and the second backoff function state used within the RAW.

* * * * *